(12) United States Patent
Grandine et al.

(10) Patent No.: US 8,892,406 B2
(45) Date of Patent: Nov. 18, 2014

(54) GEOMETRIC MODELING OF COMPOSITE PARTS

(75) Inventors: Thomas A. Grandine, Issaquah, WA (US); Matthew S. Patterson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 352 days.

(21) Appl. No.: 13/310,665

(22) Filed: Dec. 2, 2011

(65) Prior Publication Data

US 2013/0103359 A1    Apr. 25, 2013

Related U.S. Application Data

(60) Provisional application No. 61/550,429, filed on Oct. 23, 2011.

(51) Int. Cl.
*G06F 19/00* (2011.01)
*G06F 17/50* (2006.01)

(52) U.S. Cl.
CPC ............ *G06F 17/5095* (2013.01); *G06F 17/50* (2013.01); *G06F 2217/44* (2013.01)
USPC .................................. 703/1; 700/98; 700/118

(58) Field of Classification Search
CPC ...... B29C 70/30; B29C 70/38; B29C 70/386; G05B 19/19; G05B 19/4093; G05B 19/4097; G05B 19/4099; G06F 17/00; G06F 17/50; G06F 17/5009; G06F 17/5086; G06F 17/5095; G06F 19/00; G06F 2217/44
USPC ............... 700/97, 98, 118, 182; 345/420, 442
See application file for complete search history.

(56) References Cited

U.S. PATENT DOCUMENTS

| | | | |
|---|---|---|---|
| 4,849,913 A | 7/1989 | Ward | |
| 5,006,990 A | 4/1991 | Gumm et al. | |
| 7,010,472 B1* | 3/2006 | Vasey-Glandon et al. | 703/6 |
| 7,099,725 B2 | 8/2006 | Murrish et al. | |
| 2008/0312764 A1 | 12/2008 | Murrish | |
| 2010/0204815 A1 | 8/2010 | Murrish et al. | |

OTHER PUBLICATIONS

Krystek, Spline filters in surface texture analysis, 2005.*
Weisstein, Eric W. "Convolution." From MathWorld—A Wolfram Web Resource. http://mathworld.wolfram.com/Convolution.html.*
Weisstein, Eric W. "Piecewise Constant Function." From MathWorld—A Wolfram Web Resource. http://mathworld.wolfram.com/PiecewiseConstantFunction.html.*
Sealy, G. and G. Wyvill: "Smoothing of three dimensional models by convolution", Proceedings of CG International '96, Jan. 1, 1996, pp. 184-190.
Andrei Sherstyuk: "Kernel functions in convolution surfaces: a comparative analysis," The Visual Computer, vol. 15, No. 4 pp. 171-182 (Jul. 1999).
Thomas A. Grandine. "The Evaluation of Inner Products of Multivariate Simplex Splines," SIAM J. Numerical Analysis, vol. 24, No. 4 (1987), pp. 882-886.

* cited by examiner

*Primary Examiner* — Kamini S Shah
*Assistant Examiner* — Michael P Healey
(74) *Attorney, Agent, or Firm* — Hugh P. Gortler

(57) ABSTRACT

A composite part including a ply stack-up and resin is modeled. The modeling includes performing a convolution on a representation of the stack-up to approximate smoothed ramps between different plies of the stack-up.

30 Claims, 6 Drawing Sheets

FIG. 3D
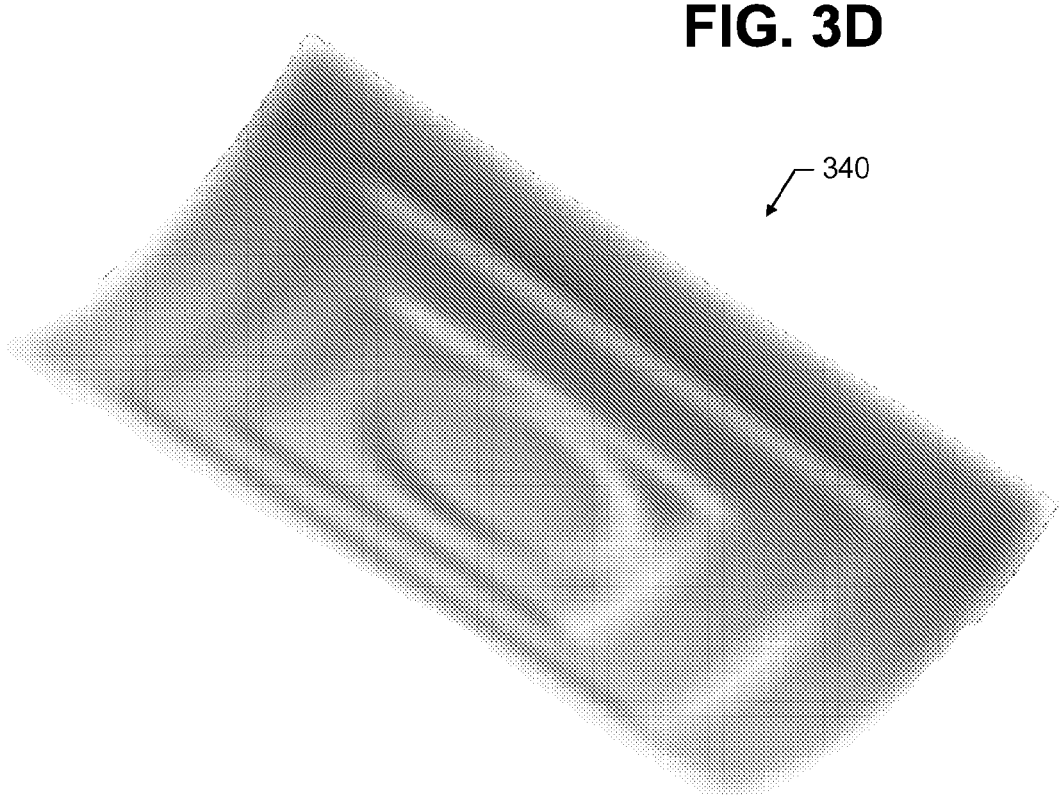
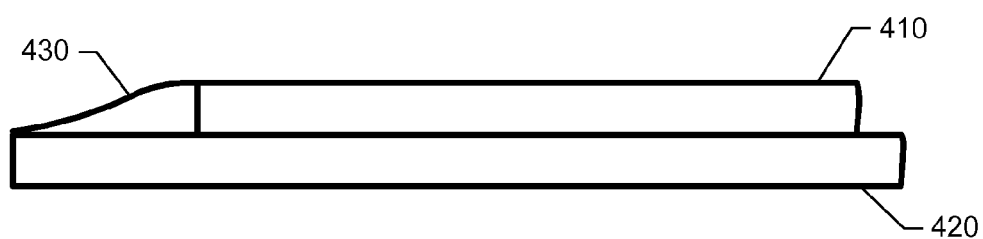
FIG. 4

FIG. 5
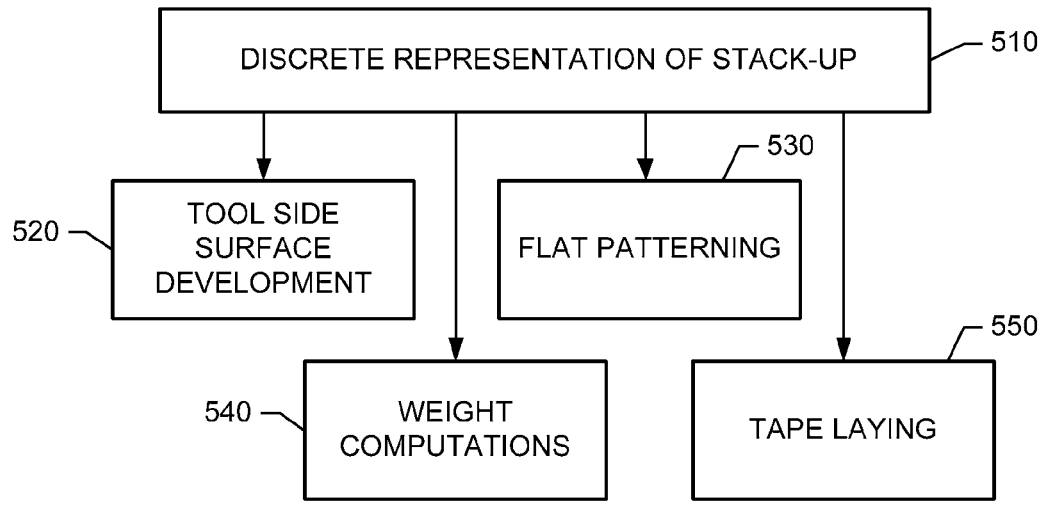
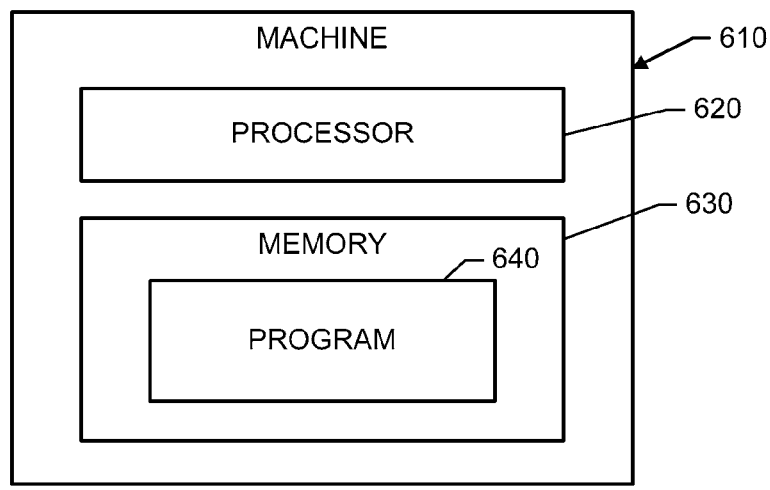
FIG. 6

GEOMETRIC MODELING OF COMPOSITE PARTS

This application claims the benefit of provisional application 61/550,429 filed Oct. 23, 2011.

BACKGROUND

Composites are attractive to the aerospace industry because of their high strength, high rigidity, and low weight. A composite structure such as skin or a stiffener may be constructed by stacking up plies of resin-infused carbon fiber tape or fabric on a mandrel, forming an air-tight envelope over the ply stack-up, and curing the stack-up.

Weight reduction in an aircraft is highly desirable, as it reduces aircraft operating costs. The weight of composite aircraft parts may be reduced by using composite material where needed. Skin may be formed from an outer ply. Pad-ups on the skin may be used to increase thickness at locations where fasteners will be installed or extra strength is needed. In a complex structure such as a composite fuselage, the skin may have an overall nominal thickness, which is padded up to various degrees over arbitrary areas for strength or gage.

A ply stack-up may have a step-like geometry. Prior to curing, edges of the ply stack-up are sharp. During curing, pre-impregnated resin flows through the stack-up, forming ramps off the edges, which transition from one ply to the next. A complex structure such as a fuselage may have tens of thousands of edges.

In the aircraft industry, it is useful to model the geometry of composite parts. The geometric model may be used to determine material properties (e.g., stresses, strains, and displacement) for the composite parts, generate tape laying sequences, and create automated NC part programs.

SUMMARY

According to an embodiment herein, a composite part including a ply stack-up and resin is modeled. The modeling includes performing a convolution on a representation of the stack-up to approximate smoothed ramps between different plies of the stack-up.

According to another embodiment herein, an apparatus comprises a computer programmed to model a composite part including a ply stack-up and resin. The modeling includes performing a convolution on a representation of the stack-up to approximate smoothed ramps between different plies of the stack-up.

According to another embodiment herein, an article comprises non-transitory computer memory programmed with data for causing a computer to model a composite part including a ply stack-up and resin. The modeling includes performing a convolution on a representation of the stack-up to approximate smoothed ramps between different plies of the stack-up.

These features and functions may be achieved independently in various embodiments or may be combined in other embodiments. Further details of the embodiments can be seen with reference to the following description and drawings.

BRIEF DESCRIPTION OF THE DRAWINGS

FIGS. 3A-3D are illustrations of a method of modeling a composite part including a ply stack-up and resin.

FIG. 4 is an illustration of a resin ramp from a first ply to a second ply.

FIG. 5 is an illustration of a method of using a model of a composite part to improve fabrication of the part.

FIG. 6 is an illustration of a machine for modeling a composite part including a ply stack-up and resin.

DETAILED DESCRIPTION

Figure 1:
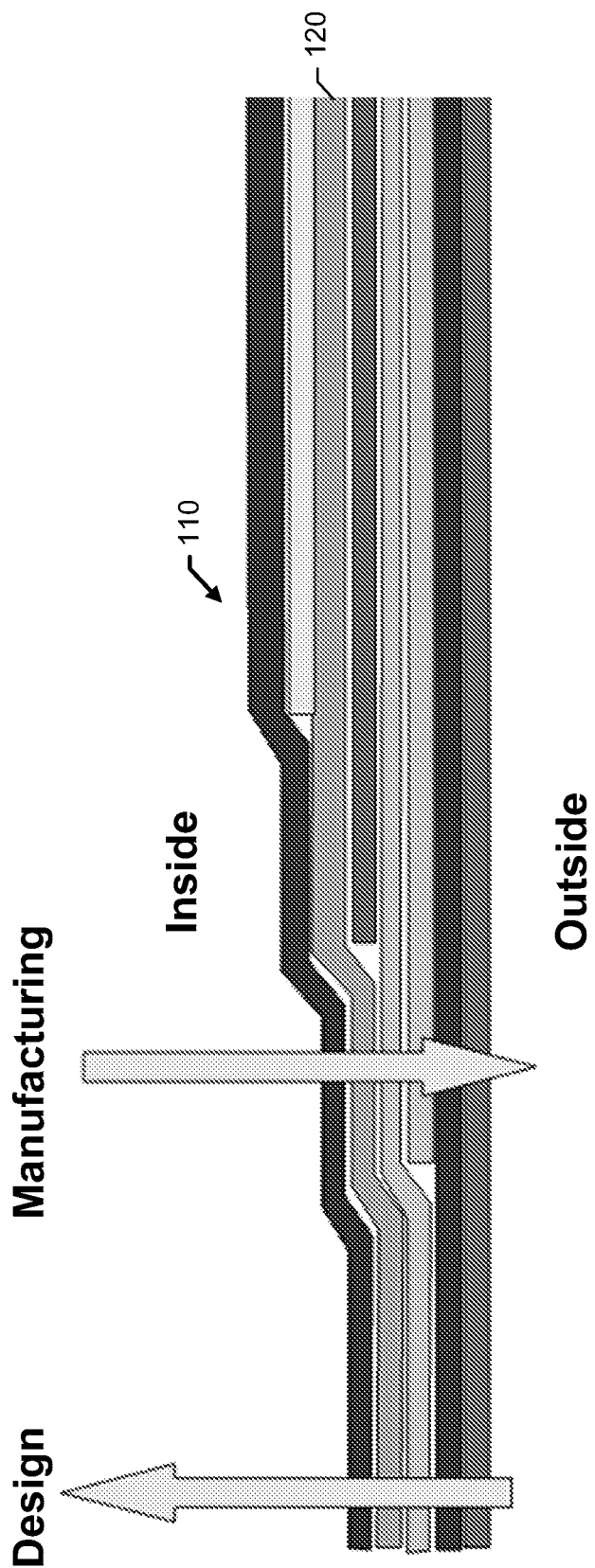
FIG. 1 is an illustration of a ply stack-up.

Reference is made to FIG. 1, which illustrates a ply stack-up 110 prior to curing. The stack-up 110 includes a plurality of plies of resin-infused fibers (e.g., between 10 and 100 plies). The fibers may be applied as tape or fabric. The plies may be stacked normal to an outside surface. The stack-up 110 has a step-like geometry. Pre-cured edges of the stack-up 110 are sharp.

In the design of composite aircraft parts, the stack-up 110 may be designed from the outer (e.g., aero) surface toward the inner surface. The stack-up 110 may be manufactured in the opposite direction (the aero surface is last to be deposited). For parts involving an outer mold line (i.e., an exterior surface of an aircraft), those parts may be designed from the outer mold line inwards towards an inner mold line. For manufacturing, the opposite may be true, especially for large structures such as fuselages, where the plies are built-up from the inner mold line outwards. The arrows in FIG. 1 are not always true for all aircraft parts (for instance, wing skins may be designed and built from the outer mold line inward toward the inner mold line). However, the arrows are intended to represent that the outer mold line may be the design surface and the inner mold line may be a tooling surface.

Figure 2A:
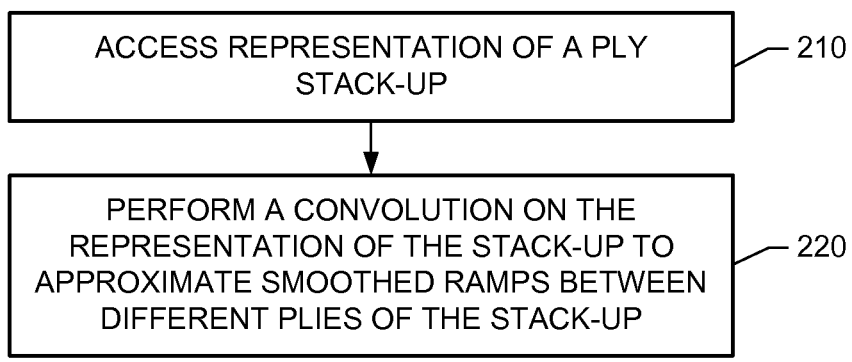
FIGS. 2A-2C are illustrations of methods of modeling a composite part including a ply stack-up and resin.

Reference is now made to FIG. 2A, which illustrates a method of modeling a composite part including a ply stack-up and resin. At block 210, a discrete representation of the ply stack-up (the "discrete correction") is accessed. The discrete correction identifies thickness of the ply stack-up at any point on its defining surface (e.g., inner or outer surface). A complex structure such as a fuselage may have tens of thousands of edges. In some embodiments, the discrete correction may be a piecewise constant function.

The discrete correction may be derived from an engineering definition of the part. The engineering definition may define surface geometry including contour and features such as holes, trim locations, and engineering edge of part. The engineering definition may also specify ply drops, ply boundaries, stacking sequence and fiber orientations within each ply. The engineering definition may define material specifications for the composite part. Software may be designed to produce the discrete representation of the stack-up by counting plies at a large number of points on the defining surface.

At block 220, a convolution is performed on the discrete representation of the stack-up. The convolution "softens" the edges and approximates a smoothed ramp between different plies of the stack-up. These smoothed ramps represent resin after curing. (During curing, the pre-impregnated resin will flow through the stack-up, forming ramps off the edges, which transition from one ply to the next.) The result of the convolution is an empirical approximation of a cured stack-up.

In practice, a stack-up will be contoured prior to curing. For instance, if the tooling surface is curved, the stack-up will be contoured according to the curve of the tooling surface.

Figure 2B:
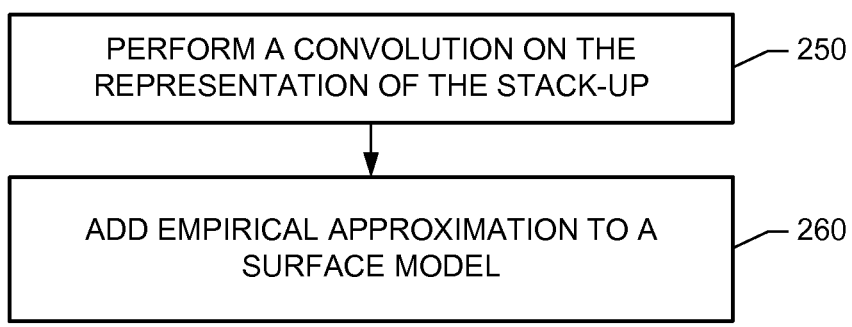
Figure 2C:
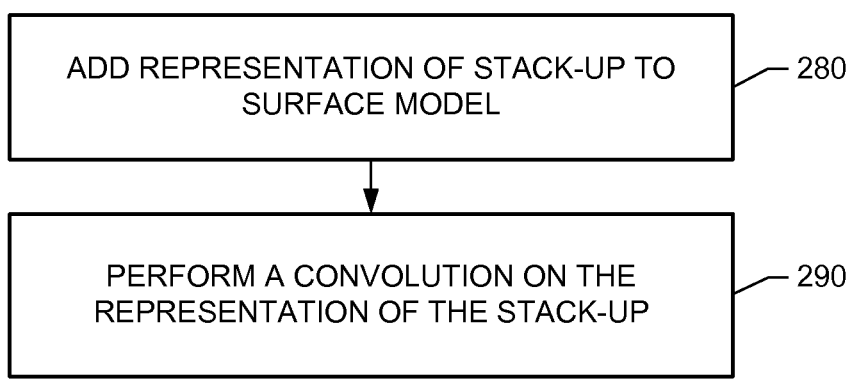

FIGS. 2B and 2C illustrate two different ways in which the empirical approximation may be contoured. The contouring may be performed after convolution (FIG. 2B) or prior to convolution (FIG. 2C). A contour may be defined by a surface model. In some embodiments, the surface model represents a tool surface (that is, the surface upon which the plies will be stacked up), which gives a contour to the cured part. In other embodiments, the surface model may represent a mating surface with another part (that is surfaces to which the composite part will be attached), an outer mold line, or any other predefined surface.

In some embodiments, the surface may be modeled as a spline. In other embodiments, surface may be modeled as primitives such as cones, spheres, planes, or a combination thereof.

In still other embodiments, the surface may be modeled procedurally. For example, a surface is mapped over a domain, where different portions of the domain are mapped in different ways. For instance, the surface is mapped to a spline or a primitive (e.g., a portion of a cylinder) over one portion of the domain, and the surface is mapped to a fillet having a prescribed radius over the remainder of the domain (e.g., at edges of a member).

Reference is made to FIG. 2B, which illustrates the first way in which the discrete correction is contoured after convolution. At block 250, a convolution is performed on the discrete representation of the stack-up to approximate smoothed ramps between different plies of the stack-up.

At block 260, the empirical approximation produced by the convolution is added to the surface model. The empirical approximation may be added to the surface model as $S(u,v) = T(u,v) + \hat{Z}(u,v)N(u,v)$, where (u,v) represents the position of a point in a unit square;

S(u,v) represents the empirical approximation that is contoured according to the surface model;

T(u,v) represents the surface model, which may be a mapping from a unit square into 3D space so that points (u,v) in the unit square are mapped to points T(u,v) on the surface;

Z(u,v) is the discrete correction;

$\hat{Z}(u,v)$ is the convolution of the discrete correction; and

N(u,v) is the surface normal.

Reference is made to FIG. 2C, which illustrates the second way in which the empirical approximation is contoured prior to convolution. At block 280, the discrete representation of the ply stack-up is combined with the surface model. Thus, the discrete correction is contoured.

At block 290, a convolution is performed on the contoured correction.

The convolution is applied only to the correction, not to the surface model. During curing of a part in an autoclave, for instance, the tooling surface isn't changed by the applied heat and pressure.

Figure 3A:
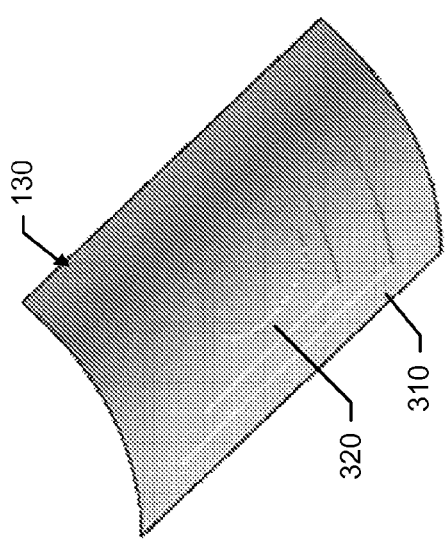
Figure 3B:
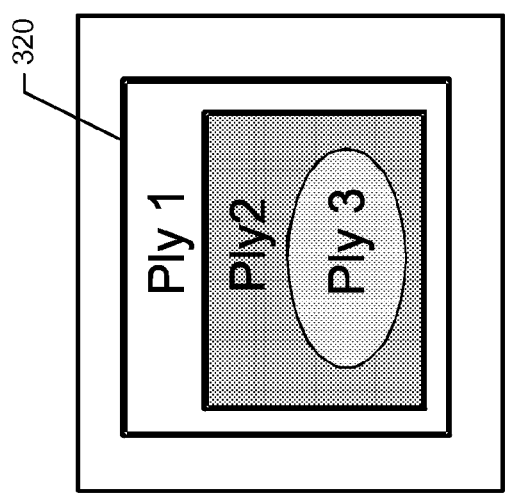
Figure 3C:
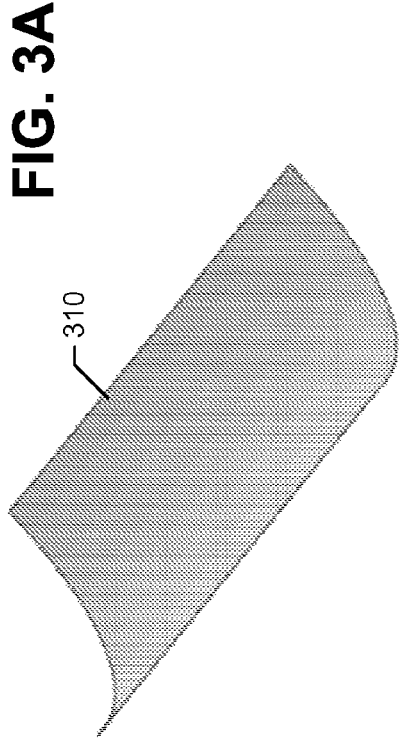

FIGS. 3A-3D illustrate the method of FIG. 2C. A contoured underlying surface 310 (e.g., a tooling surface) is illustrated in FIG. 3A, and a 2D stack-up 320 including three plies is illustrated in FIG. 3B. A combined representation 330 of the stack-up 320 on the contoured surface 310 is illustrated in FIG. 3C. In this combined representation 330, the stack-up 320 is located on the surface 310, and the edges of the stack-up 320 are sharp. The stack-up 320 follows the contour of the underlying surface 310.

FIG. 3D illustrates the approximation 340 resulting from the convolution on the contoured discrete correction. Resin ramps are formed from the third ply to the second ply, from the second ply to the first ply, and from the first ply to the surface 310.

FIG. 4 illustrates a resin ramp 410 that transitions from a first ply 420 to a second ply 430.

The convolution is performed with a kernel. As but one example, the convolution may be performed with a B-spline convolution kernel. The B-spline kernel is defined by its knots and its order. The convolution may be performed as $$\int_{-\infty}^{\infty} Z(t|x_0, \ldots, x_n) M(x-t|y_0, \ldots, y_m) dt$$

where Z is a piecewise constant function that defines the normal component of a 2D ply stack-up, and M is a B-spline convolution kernel defined by its knots and order.

In designing the kernel, knot structure is constructed, and the order is selected. The order determines the amount of smoothing. The knot structure and order fix the coefficients of the kernel. The knot structure affects the modeling of the movement of resin. Roughly speaking, the farther knots are located from the center of the kernel, the more flow that is represented.

In some embodiments, the kernel may be volume-preserving. A volume preserving kernel is a kernel that integrates to unity over the entire domain. When it is applied through a convolution operator, the integral of the original object remains unchanged. In the case of a convolution, this means that the volume of the composite part does not change.

However, the kernel is not limited to one that is volume-preserving. Using non-volume preserving kernels enables modeling the situation in which compression of material occurs during curing.

In some embodiments, a choice of kernels may be available, and the convolution is performed with a kernel that is chosen according to characteristics of the resin. For example, a selection may be made between a first kernel corresponding to a first type of resin and a second kernel corresponding to another type of resin that flows more freely and is more likely to form a longer ramp. The different kernels may be distinguished by different knot structures, or different types of kernels may be used. Examples of other types of kernels include Gaussian distributions and probability density functions. However, the B-spline is faster than these other kernels, and since the B-spline is dense within space, it can be configured to model different flows of resin.

Reference is now made to FIG. 5. The modeling herein (block 510) may be used advantageously to improve composite fabrication processes. As a first example, the modeling herein may be used to develop tool side surfaces (block 520). Starting with an exterior surface, plies are continually added and smoothed until a tool side surface is obtained. These tool side surfaces may be used to machine molds.

As a second example, modeling of an intermediate layer of a stack-up may be used to improve flat patterning (block 530). For instance, if the empirical approximation reveals that a ply extends beyond the resin ramp, that ply may be shortened. If the empirical approximation reveals that the ply is too short, the ply may be lengthened.

As a third example, the modeling may be used to reduce the uncertainty of weight computations. The modeling may reduce uncertainty over the amount or resin, length and thickness of the plies (which affects the ply weight), center of gravity, and moments of inertia etc.

As a fourth example, the modeling may be used to infer tape laying sequencing (block 550). The modeling provides smooth surfaces over which geodesics can be computed reliably and accurately. These geodesics form the basis of computations which improve tape laying operations, including sequencing and orientation and steering of tape laying heads.

A method herein is not limited to modeling the final surface of a composite part. In some embodiments, a method herein may be used for the modeling of intermediate or partial ply stack-ups. Intermediate ply locations may be useful for providing repair schematics and performing mass property calculations for non-homogeneous ply stacks, both of which require models for cured partial ply stacks. An intermediate ply may be modeled simply by leaving off all plies above that intermediate ply.

Reference is now made to FIG. 6, which illustrates a machine 610 including a processor 620, and non-transitory machine-readable memory 630. In some embodiments, the machine 610 may be a computer. A program 640 is stored in the memory 630. When executed in the machine 610, the program 640 performs modeling of one or more composite parts as described herein.

Figure 7:
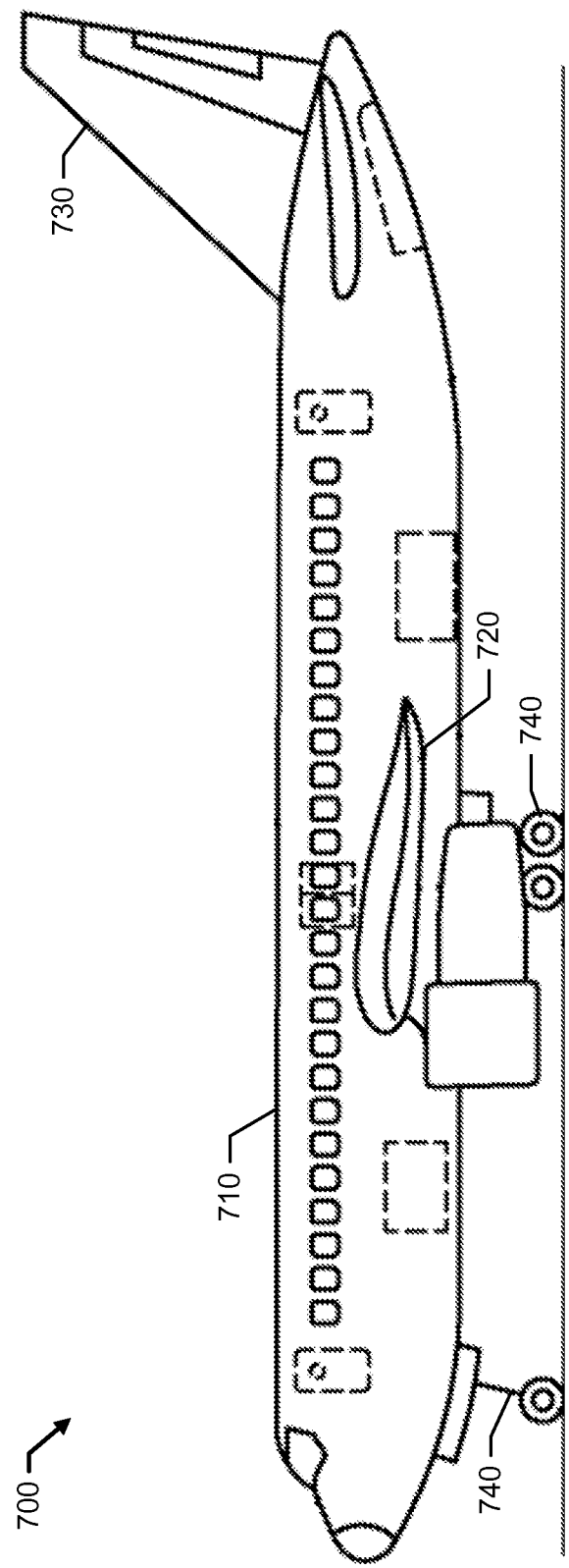
FIG. 7 is an illustration of an aircraft including parts that may be modeled according to embodiments herein.

Reference is made to FIG. 7, which illustrates an example of a composite aircraft 700. The aircraft 700 includes components and parts thereof that may be modeled according to a method herein. The components may include, but are not limited to a fuselage 710, wing assemblies 720, empennage 730, and landing gear assemblies 740.

The invention claimed is:

1. A method of modeling a composite part including a ply stack-up and resin, the method comprising using a computer programmed to perform a convolution on a representation of the stack-up to approximate smoothed ramps between different plies of the stack-up, the computer performing the convolution with a kernel that is chosen according to characteristics of the resin.

2. The method of claim 1, the computer also contouring the representation of the stack-up prior to the convolution.

3. The method of claim 1, the computer also contouring the representation of the stack-up after the convolution.

4. The method of claim 1, wherein the representation of the stack-up is contoured with a surface that is modeled procedurally.

5. The method of claim 1, wherein a top ply of the representation corresponds to a mold line ply of the stack-up.

6. The method of claim 1, wherein a top ply of the representation corresponds to an intermediate ply of the stack-up.

7. The method of claim 1, wherein the representation identifies thickness of the stack-up at discrete points on a defining surface of the stack-up.

8. The method of claim 1, wherein the representation identifies thousands of edges.

9. The method of claim 1, wherein the kernel is volume-conserving.

10. The method of claim 1, wherein the kernel is a B-spline convolution kernel.

11. The method of claim 10, wherein the convolution is performed as $$\int_{-\infty}^{\infty} Z(t|x_0,\ldots,x_n) M(x-t|y_0,\ldots,y_m) dt$$

where Z is a piecewise constant function that defines a normal component of a 2D ply stack-up, and M is the B-spline convolution kernel, the kernel defined by its knots and order, t is an integration variable, x is an independent variable at which the convolution is evaluated, y represents the knots, and n represents the number of potentially different constant values in the piecewise constant function.

12. The method of claim 1, wherein the part is a fuselage part of a commercial aircraft.

13. The method of claim 1, further comprising using a result of the convolution to define geodesics for tape laying for the composite part.

14. The method of claim 1, further comprising using a result of the convolution to develop a tool side surface for the composite part.

15. The method of claim 1, further comprising using a result of the convolution for flat patterning of the composite part.

16. A method of modeling a composite part including a ply stack-up and resin, the method comprising using a computer programmed to perform a convolution on a representation of the stack-up to approximate smoothed ramps between different plies of the stack-up; wherein the computer performs the convolution with a B-spline convolution kernel, and distance of knots from a center of the kernel corresponds to how the resin flows from edges of the stack-up.

17. An apparatus comprising a computer programmed to model a composite part including a ply stack-up and resin, the modeling including performing a convolution on a representation of the stack-up to approximate smoothed ramps between different plies of the stack-up, the computer programmed to perform the convolution with a kernel having a knot structure that represents how the resin flows from edges of the stack-up.

18. The apparatus of claim 17, wherein the kernel is a B-spline convolution kernel.

19. The apparatus of claim 17, wherein the representation identifies thickness of the stack-up at discrete points on a defining surface of the stack-up.

20. The apparatus of claim 17, wherein the convolution is performed on the representation of the stack-up to produce an empirical approximation, and wherein the empirical approximation is added to a surface model.

21. The apparatus of claim 17, wherein the representation of the stack-up is combined with a surface model to produce a contoured correction, and wherein the convolution is performed on the contoured correction.

22. The apparatus of claim 17, wherein the kernel is volume conserving.

23. The apparatus of claim 17, wherein the computer is further programmed to use the modeling to improve composite fabrication processes.

24. An article comprising non-transitory computer memory programmed with data that causes a computer to model a composite part including a ply stack-up and resin, the modeling including performing a convolution on a representation of the stack-up to approximate smoothed ramps between different plies of the stack-up, the convolution performed with a kernel that is chosen according to characteristics of the resin.

25. The article of claim 24, wherein the representation identifies thickness of the stack-up at discrete points on a defining surface of the stack-up.

26. The article of claim 24, wherein the convolution is performed on the representation of the stack-up to produce an empirical approximation, and wherein the empirical approximation is added to a surface model.

27. The article of claim 24, wherein the representation of the stack-up is combined with a surface model to produce a contoured correction, and wherein the convolution is performed on the contoured correction.

28. The article of claim 24, wherein the kernel is volume-conserving.

29. The article of claim 24, wherein the kernel is a B-spline convolution kernel.

30. The article of claim 24, wherein the data further causes the computer to use the modeling to improve composite fabrication processes.

* * * * *